United States Patent [19]

Kruse

[11] Patent Number: 5,465,829

[45] Date of Patent: Nov. 14, 1995

[54] PALLET WITH HOPPER AND AUGUER AND METHOD FOR DISTRIBUTING PARTICULAR MATERIAL

[75] Inventor: Larry D. Kruse, Boyden, Iowa

[73] Assignee: Sudenga Industries, Inc., George, Iowa

[21] Appl. No.: 389,556

[22] Filed: Feb. 15, 1995

Related U.S. Application Data

[63] Continuation of Ser. No. 189,195, Jan. 31, 1994, abandoned.

[51] Int. Cl.⁶ .................................................... B65G 21/10
[52] U.S. Cl. ........................ 198/538; 198/671; 198/674; 414/608; 414/526
[58] Field of Search ..................... 198/657, 670, 198/671, 674, 536, 538, 550.1, 550.2; 414/608, 519, 526, 326, 498

[56] References Cited

U.S. PATENT DOCUMENTS

| | | | |
|---|---|---|---|
| 3,717,272 | 2/1973 | Chartier et al. | 198/657 X |
| 3,802,584 | 4/1974 | Sackett, Sr. et al. | 198/538 X |
| 4,095,705 | 6/1978 | Hood | 198/674 X |
| 4,923,358 | 5/1990 | Van Mill | 198/671 X |
| 4,963,066 | 10/1990 | Boppart | 198/671 X |
| 5,253,746 | 10/1993 | Friesen et al. | 198/674 X |
| 5,257,725 | 11/1993 | Volk, Jr. et al. | 414/608 X |
| 5,257,893 | 11/1993 | Sevits | 414/523 |
| 5,339,996 | 8/1994 | Dubbert et al. | 414/608 |

OTHER PUBLICATIONS

Sudenga Industries, Inc., *Gravity Wagon Belt Conveyor*, May 1993.

*Primary Examiner*—D. Glenn Dayoan
*Attorney, Agent, or Firm*—Kinney & Lange

[57] ABSTRACT

A pallet for use in transporting a container housing a particulate material, the container having a gate for releasing the particulate material from the container. The pallet includes a frame member for receiving the container, a hopper mounted to the frame member for receiving the particulate material from the container when the container gate is open, an conveyor having a feed end and a discharge end, the feed end of the conveyor being fixedly mounted to the hopper for transporting the particulate material from the hopper to the discharge end of the conveyor to fill a desired target with the particulate material, and a drive system for driving the conveyor.

24 Claims, 3 Drawing Sheets

PALLET WITH HOPPER AND AUGUER AND METHOD FOR DISTRIBUTING PARTICULAR MATERIAL

This is a File Wrapper Continuation of application Ser. No. 08/189,195, filed Jan. 31, 1994, now abandoned.

BACKGROUND OF THE INVENTION

The present invention relates to pallets used in transporting containers, and more particularly, to a pallet having a hopper and a conveyor, such as belt conveyor or auger, for unloading material in a container which is positioned on the pallet.

Farm implements, such as planters, typically have a row of four, six, eight or twelve boxes which are filled with seed and used to plant a corresponding number of crop rows. In the past, in order to fill the planter boxes, the farmer had to carry individual 50–100 pound bags of seed, such as corn or soybean, to the planter. The farmer typically carried these bags one at a time and then cut each bag open and dump the contents into the appropriate planter box. The entire process was very labor intensive. In addition, the empty bags often were stacked in the field and later burned which produced undesired environmental consequences since the bags often contained chemicals which would enter the environment when the bags were burned.

To solve the environmental problems and the problem of stacking the bags in the field, corn or soybean seed are sold in large collapsible bulk containers capable of holding up to 2,500 pounds of seed. After the seed is delivered, the containers are collapsed and re-used. However, the bulk container approach still requires the labor intensive process of manually transferring and loading the seed from the bulk containers to the planter boxes. There are also large individual bulk canvass bags which reduce the environmental concerns and the number of bags to be stacked in the field. However, the handling of seed in canvas bags did not reduce the labor-intensive nature of the process.

SUMMARY OF THE INVENTION

The present invention relates to a pallet for use in transporting a container containing a particulate material therein, the container having a gate thereon for releasing the particulate material from the container. The pallet includes a frame member for receiving the container. A hopper is mounted to the frame for receiving the particulate material from the container when the container gate is open. The feed end of a conveyor is fixedly mounted to the hopper for transporting the particulate material from the hopper to a discharge end of the conveyor to load a desired target with the particulate material. Drive means drives the auger.

Preferably, the drive means includes a hydraulic motor and hydraulic hoses so that the hydraulic motor is operatively connected to a hydraulic system of an external power source such as a tractor adapted with a forklift for transporting the pallet and container. Preferably, the conveyor includes a semi-transparent accordion-type spout at its discharge end allowing an operator to adjust the position of the spout and to view the particulate material in the spout as an indication that the desired target is filled.

In one embodiment the gate and hopper are positioned at a side of the frame member with the conveyor being mounted to a periphery of the frame outside the region of the container. In another embodiment the gate and hopper are more centrally located with the conveyor extending through the frame member. In a further embodiment a first hopper is mounted to the periphery of the frame for receiving a bulk seed container and a second hopper is mounted in the center of the frame for receiving a bulk sack container.

DETAILED DESCRIPTION OF THE PREFERRED EMBODIMENTS

Figure 1:
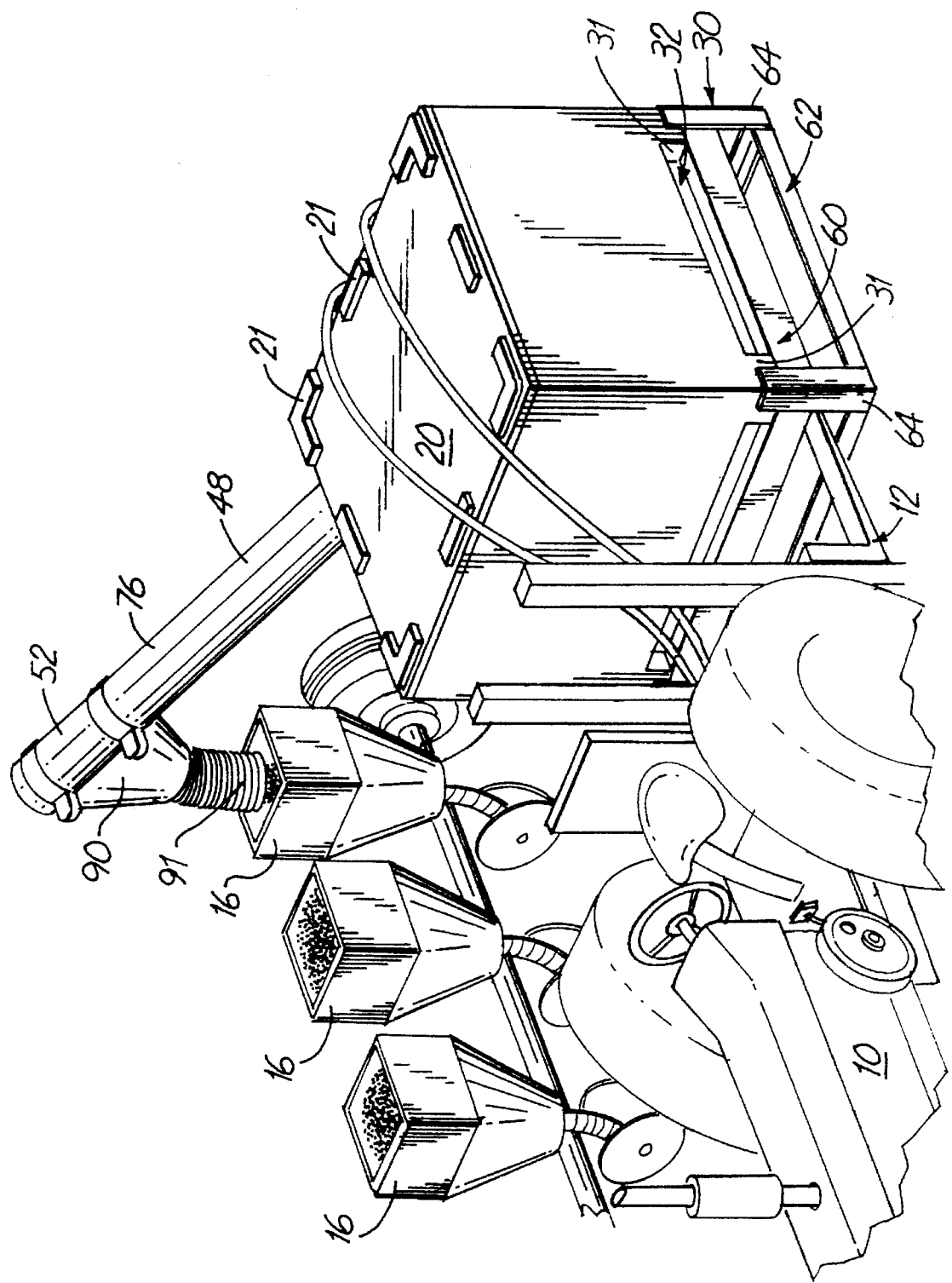
FIG. 1 is a perspective view showing use of the pallet according to the present invention.
Figure 2:
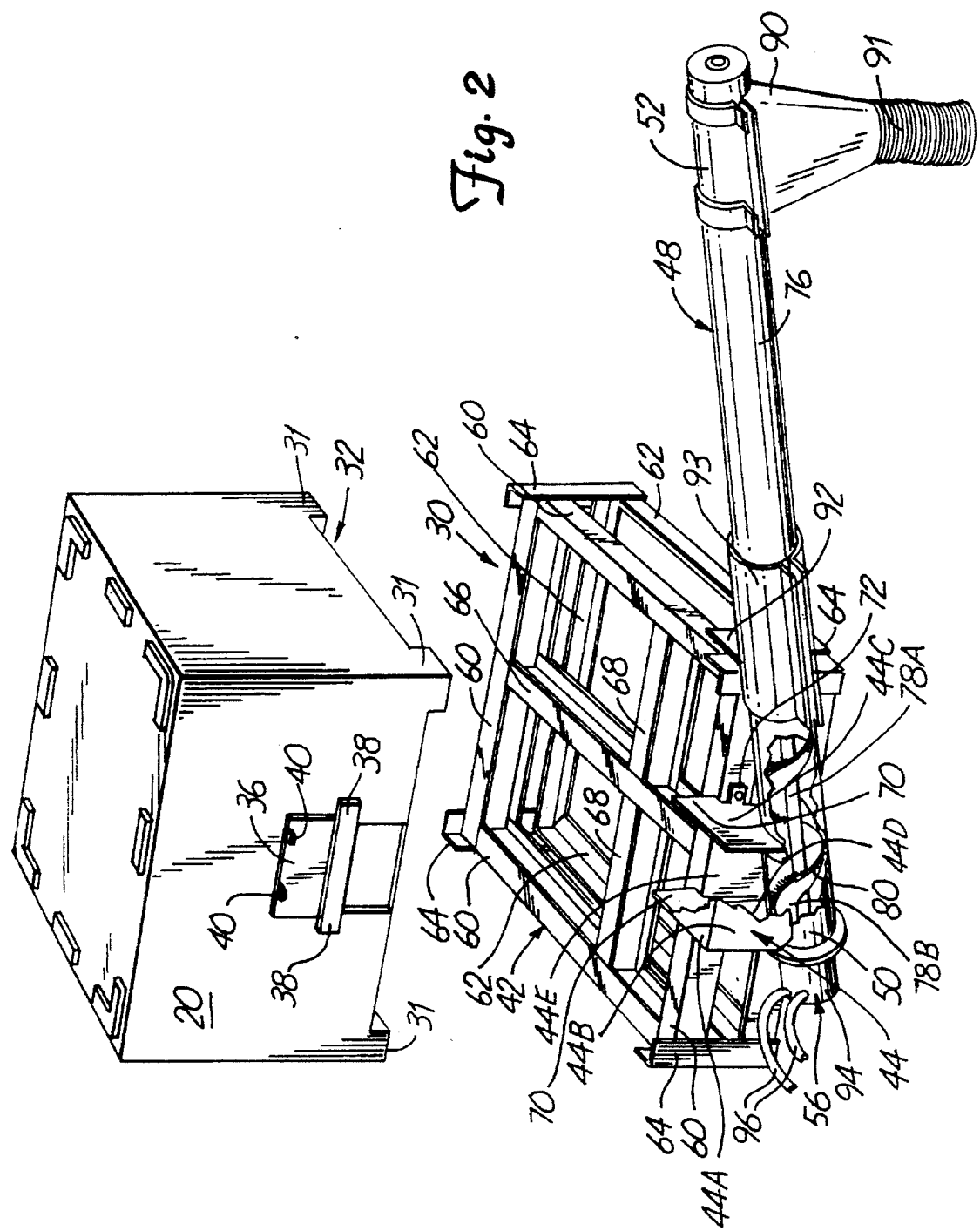
FIG. 2 is a perspective view of the pallet of the present invention with portions of the auger tube and hopper broken away.

Referring to FIG. 1, a tractor 10 equipped with a three-point hitch mounted forklift 12 is positioned parallel to the back of a planter for filling the planter boxes 16 with seed from a bulk container 20. The bulk seed container 20 is positioned on a pallet 30 according to the present invention. The bulk seed container 20 is, for example, a Q-Bit seed container available from Northrup King of Minneapolis, Minn. The seed container 20 includes feet 31 forming a space 32 to accept forklift 12 so that the container 20 can be moved. The bulk seed containers 20 each hold about 2,500 pounds of seed and have length, width and height dimensions of approximately 45 inches by 48 inches by either 46 or 54 inches, depending on the type of seed. The bulk seed containers 20 are collapsible so that they may be reused and have a "footprint" 21 on the lid so that multiple containers 20 may be stacked in place. Referring to FIG. 2, the container 20 has a gate 36 which is held in place by cross bars 38 and which is removed by finger tabs 40 to allow the particulate material in the container 20 to flow therefrom.

The pallet 30 includes a frame member 42 for receiving the container 20, a hopper 44 mounted to the frame member 42 for receiving particulate material from the container 20 when the container gate 36 is opened, an auger 48 having a feed end 50 mounted to the hopper 44 for transporting particulate material from the hopper 44 to a discharge end 52 of the auger 48 to fill the planter boxes 16 or other desired target with the particulate material, and a drive system 56 for driving the auger 48.

Referring to FIG. 2, the frame member 42 includes a first rectangular frame section 60 of approximately the same dimensions as the length and width of the container 20, a second rectangular frame section 62 of approximately the same size and dimension as the first rectangular frame section 60 and which is connected to and spaced apart from the first rectangular frame section 60 by corner brackets 64. The first and second rectangular frame sections 60 and 62 are spaced apart a sufficient distance to allow the forklift 12 to pass through and lift the pallet 30. The corner brackets 64 extend past the first rectangular frame section 60 to engage and retain the bulk seed container 20 on the frame member 42. The frame member 42 also includes a first support brace 66 and a second support brace 68 for maintaining the shape and integrity of the frame member 42 and for additional engagement of the forklift 12.

The frame member 42 is constructed of steel for support of the bulk seed container 20. The first rectangular frame member 60 is constructed of four three-sided U-shaped 12-gauge steel members. The second rectangular frame member 62 is constructed of four two-sided L-shaped 12-gauge steel members. The first and second support braces 66 and 68 are constructed of three-sided U-shaped 12-gauge steel members.

The hopper 44 is constructed of 14-gauge steel and includes a top wall 44A, back wall 44B, first and second side walls 44C and 44D, and a front/bottom wall 44E. The front/bottom wall 44E of the hopper 44 is welded to the exterior of the first rectangular frame section 60 and the first and second side walls 44C and 44D form an opening operable with the gate 36 of the seed container 20. A rubber sealing member 70 at the leading edge of the side walls 44C and 44D extends out slightly over the first rectangular frame section 60 to provide a sealing fit between the gate 36 opening of the seed container 20 and the hopper 44 so that the seed does not spill out the hopper 44. A pair of support brackets 72 (only one of which is shown) mounted between the first side wall and second side walls 44C and 44D, and the first rectangular frame section 60 provides additional mounting support for the hopper 44 and auger 48.

The auger 48 includes an inclined auger tube 76 containing a helical auger flight 78 rotatably mounted therein. The auger flight 78 is of conventional structure and includes a shaft 78A and a helical screw 78B surrounding the shaft 78A which operates in a well-known manner to transport the particular material along the length of the auger tube 76 by rotation of the shaft 78A about its axis. The auger screw 78B has a plastic bristle 80 along its outer periphery to soften the pinch points between the auger screw 78B and the auger tube 76 to avoid slicing seeds in half. The feed end 50 of the auger tube 76 is connected to the hopper 44 and a portion of the auger flight 78 is exposed within the hopper 44 for collecting particulate materials dumped into the hopper 44 by opening of the container gate 36. The discharge end 52 of the auger tube 76 is connected to a downwardly directed discharge spout 90 which is in turn connected to a semi-transparent accordion-shaped flexible tube 91 which allows the operator of the tractor 10 to view material (e.g. seed) piling up in the discharge spout 90 as an indication that the desired target is filled and which permits manual adjustment of the position of the flexible tube 91 relative to the planter boxes 16. A support bracket 92 engages a sleeve 93 and the auger tube 76 to mount the auger tube 76 to the frame member 42 such that the auger is positioned at approximately between a 30° and 60° angle, and preferably at a 45° angle, to the frame member 42.

The auger 48 is powered by the drive system 56 which includes a hydraulic motor 94 and hydraulic hoses 96 which are connected to the hydraulic system of the tractor 10. However, it is to be understood that the auger 48 may be driven in any conventional manner including a self-contained drive system on the pallet 30 which could be remotely operated by an operator on the tractor 10. The illustrated embodiment is preferred because it provides an inexpensive and reliable method of driving the auger 48 using the hydraulic system on the tractor 10. It is also to be understood that a three-point hitch could be built directly onto the pallet 30, so that persons not equipped with a three-point hitch tractor mounted for forklift 12 could use the pallet 30. In this case such persons could use tractor loader forks or other means to move the bulk seed container on and off the pallet 30.

Referring to FIG. 1, application of the pallet 30 will now be described in a farm environment wherein the bulk seed container 20 holds seed for distribution by the planter. The bulk seed container 20 is delivered on a flat bed trailer or the like and a tractor 10 equipped with a three-point hitch-mounted forklift 12 which picks up the bulk seed container 20 and moves it onto the pallet 30. The forklift 12 then picks up the pallet 30 with the bulk seed container 20 on top of it. At this time a tractor operator connects the hydraulic hoses 96 from the auger hydraulic motor 96 to the hydraulic system on the tractor 10 and pulls open the container gate 36 on the bulk seed container 20, thereby allowing seed to flow into the hopper 44. The tractor operator then raises the pallet 30 and bulk seed container 20 to a height such that the discharge spout 90 of the auger 48 is above the seed box 16 to be filled on the planter. The tractor 10 is then positioned parallel to the back of the planter 14 and the discharge spout 90 is positioned over the first planter box 16 to be filled. Final positioning of the discharge of seed is accomplished manually by the operator by adjustment of accordion-shaped tube 91. The forklift 12 then lowers the pallet 30 and bulk seed container 20 so that the discharge spout 90 is just below the lip of the planter box 16. At this point, the tractor operator engages a hydraulic valve (not shown) on the tractor 10 allowing hydraulic fluid to flow to the hydraulic motor 94 thereby rotating the auger shaft 78A and auger flight 78B and conveying seed up the auger tube 76 to the discharge spout 90 and into the planter seed box 16.

When the operator sees the seed backing up in the semi-transparent flexible tube 91, the operator disengages the hydraulic valve thereby stopping the auger 48. The operator then raises the forklift 12 and the pallet 30 up so that the semitransparent flexible tube 91 clears the edge of the seed box 16 allowing the seed contained therein to spill out of the discharge spout 90 and top off the planter box 16. The tractor 10 is driven ahead to the next planter seed box 16 and the procedure is repeated again until all of the planter seed boxes 16 are filled. Using the pallet 30 automates the entire procedure of loading the planter seed boxes 16 and thereby saves the operator from having to manually carry over and load individual boxes or bags of seed into the planter 14.

Figure 3:
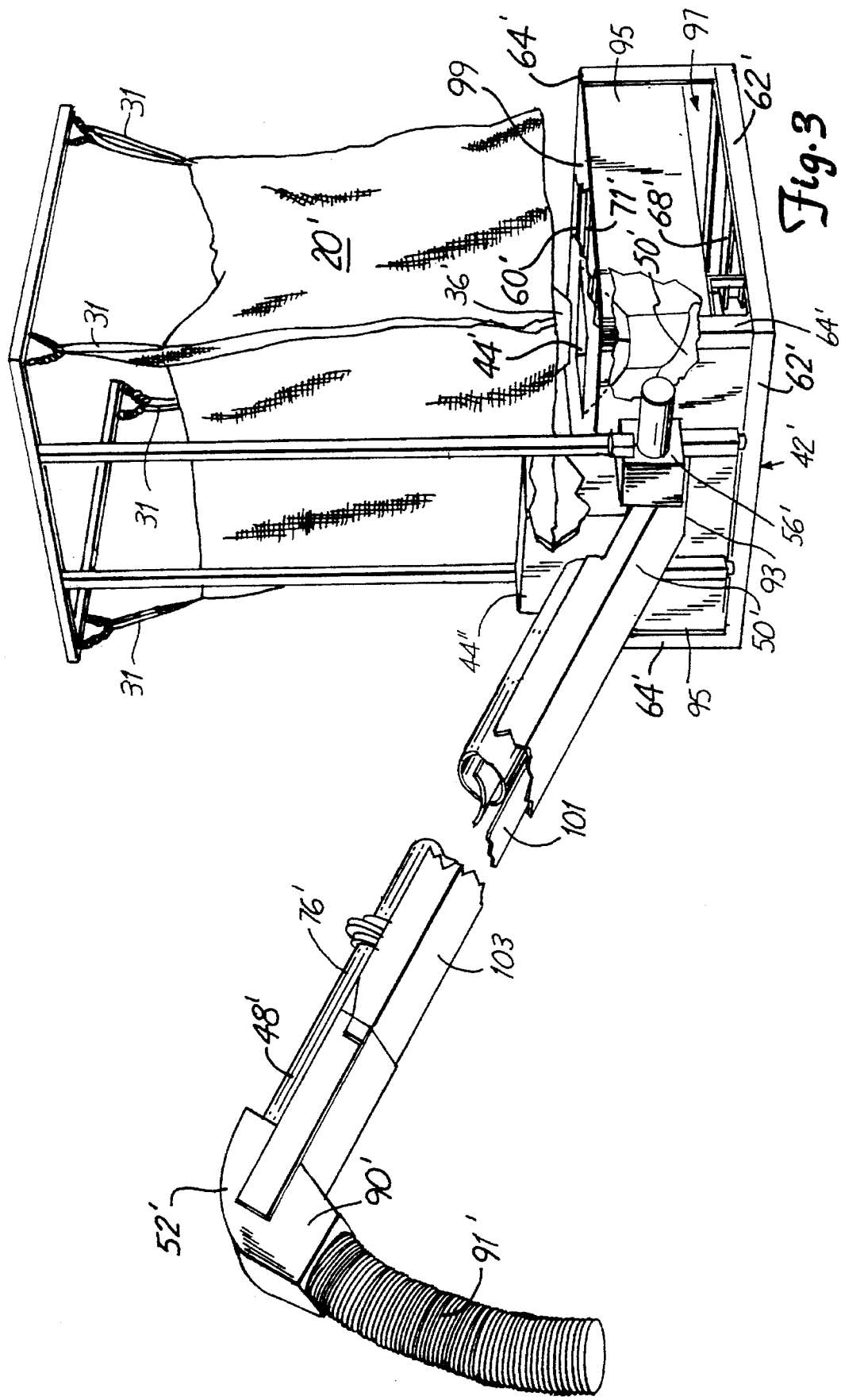
FIG. 3 is a perspective view of another embodiment of the pallet according to the present invention.

FIG. 3 illustrates an alternative embodiment of a pallet 30' according to the present invention wherein the bulk seed container is a large canvas sack 20' which holds approximately 2,500 pounds of seed or other particulate material and which has lift straps 31 thereon such that the sack 20' can be positioned on the pallet 30'. The sack 20' has an opening or gate 36' (shown in phantom) which is positioned in the center of the pallet 30' for dispensing the particulate material contained therein. The pallet 30' includes a frame member 42' adapted for receiving the sack 20' or the bulk seek container 20 (shown in FIGS. 1 and 2), a first hopper 44' mounted in the center of the frame member 42' for receiving particulate material from the sack 20' when the sack gate 36' is opened, a second hopper 44" for receiving particulate material from a bulk seed container 20 if it is used instead of the sack 20', a belt conveyor 48' having a feed end 50' mounted to the first hopper 44' and to the second hopper 44" for transporting particulate material from the first hopper 44' or the second hopper 44" to a discharge end 52' of the belt conveyor 48' to fill a desired target with the particulate material, and a drive system 56' for driving the belt conveyor 48'.

The frame member 42' includes a first rectangular frame section 60' and a second rectangular frame member 62' of approximately the same size and dimension as the first rectangular frame section 60' and which is connected to and spaced apart from the first rectangular frame section 60' by corner brackets 64'. The spacing distance between the first and second rectangular frame sections 60' and 62' is sufficient to permit the auger 48' to angle upward therethrough such that the auger 48' is mounted through an opening 93 to a wall segment 95 between the first and second rectangular frame sections 60' and 62'. Additional wall segments 95 provide an opening 97 for receiving the forklift 12. The corner brackets 64' may extend below the second rectangular frame section 62'. A support plate 99 is provided on and supported by the first rectangular frame section 60' for supporting the sack 20' or the bulk seed container 20.

The belt conveyor 48' includes a belt conveyor tube 76', having a feed end 50' and a discharge end 52', a belt 101 which runs inside the tube 76' and then loops around the discharge end 52' and runs outside the tube 76' back to the feed end 50 to complete an endless loop, and a shield 103 which shields the exposed portion of the belt 101. The drive system 56' drives the belt 10' in order to transport particulate material from the first hopper 44' or the second hopper 44" to the planter boxes. The operation and construction of the belt conveyor 48' is well known to those skilled in the art. The first hopper 44' is mounted to the center of the first rectangular frame section 60' by support braces (not shown) between the members of the first rectangular frame section 60', and is adapted for receiving the sack gate 36'.

The second hopper 44" is mounted on the auger tube 76' of the belt conveyor 48' adjacent to the first rectangular frame section 60' and is adapted for receiving the gate of the bulk seed container 20. The second hopper 44' is similar to the hopper 44 shown in FIG. 2, except that the second hopper 44" has an inlet opening into a mid-portion of the conveyor so that the particulate material is discharged from the bulk seed container into the conveyor belt. The embodiment illustrated in FIG. 3 operates in the same manner as the embodiment illustrated in FIGS. 1 and 2.

Although the present invention has been described with reference to preferred embodiments such as where the container 20 has a side gate 36 or a center gate 36', workers skilled in the art will recognize that changes may be made in the spirit and scope of the invention such that the pallet is constructed to conform to whatever kind of bulk container and gate is used to automate the process of unloading particulate material from a bulk container to fill desired targets. Workers skilled in the art will recognize that other changes may be made in form and detail without departing from the spirit and scope of the invention.

What is claimed is:

1. A pallet for supporting a container containing a particulate material and for transporting the particulate material, the container having a gate thereon for releasing the particulate material from the container, the pallet comprising:

a frame member for supporting the container;

a first hopper mounted to the frame member and arranged with respect to the gate to receive the particulate material from the container when the gate is open;

a conveyor having a feed end and a discharge end, the feed end of the conveyor being fixedly mounted to the hopper for transporting the particulate material from the hopper to the discharge end of the conveyor to fill a desired target with the particulate material; and drive means for driving the conveyor.

2. The pallet of claim 1, wherein the conveyor is an auger.

3. The pallet of claim 1, wherein the conveyor includes a semi-transparent spout to allow an operator to view particulate material in the spout as an indication that the desired target is filled.

4. The pallet of claim 1, wherein the conveyer includes an accordion-shaped spout to permit manual adjustment of the spout relative to the target.

5. The pallet of claim 1, wherein the drive means includes a hydraulic motor and hydraulic hoses.

6. The pallet of claim 5, wherein the hydraulic motor is operatively connectable to a hydraulic system on an external power source.

7. The pallet of claim 6, wherein the external power source is a tractor adapted with a forklift.

8. The pallet of claim 1, wherein the first hopper is mounted to a center of the frame member.

9. The pallet of claim 1, wherein the frame member includes a first rectangular frame section, a second rectangular frame section of approximately the same size and dimension as the first rectangular frame section and which is connected to and spaced apart from the first rectangular frame section by corner brackets.

10. The pallet of claim 9, wherein the conveyer is inclined upward from the feed end to the discharge end from the center of the frame member such that the conveyer passes between the first and second rectangular frame members.

11. The pallet of claim 10, wherein the corner brackets extend past the first rectangular frame section to engage and retain the container on the frame member.

12. The pallet of claim 1, wherein the conveyor is inclined upward from the feed end and is attached to a periphery of the frame member.

13. The pallet of claim 1, wherein the first hopper is mounted to a periphery of the frame member.

14. The pallet claim 13, further conveying a second hopper mounted in a center of the frame member.

15. The pallet of claim 1, wherein the conveyor is a belt conveyor.

16. A method of distributing particulate material stored in a container having a gate thereon for releasing the particulate material, the method comprising the steps of:

providing a pallet having a frame member receiving the container, a first hopper mounted to the frame member for receiving the particulate material from the container when the container gate is open, a conveyer having a feed end and a discharge end, the feed end of the conveyer being fixedly mounted to the first hopper for transporting seed from the first hopper to the discharge end of the conveyer, and drive means for driving the conveyor;

providing a lift apparatus;

positioning the container on the pallet;

positioning the pallet on the lift apparatus with the container on the pallet;

opening the gate of the container such that the particulate material flows into the hopper;

positioning the discharge spout of the conveyer over a desired target; and selectively engaging the drive means to start and stop transport of the particulate material through the conveyer to the desired target.

17. The method of claim 16, further comprises the step of connecting the drive means to an external power supply on the lift apparatus for driving the conveyer.

18. The method of claim 17, wherein the drive means includes a hydraulic motor and hydraulic hoses, wherein the forklift apparatus includes a hydraulic assembly, and wherein the method further comprises the step of connecting the hydraulic hoses of the drive means to the hydraulic assembly of the forklift apparatus.

19. The method of claim 16, wherein the conveyer is an auger.

20. The method of claim 16, wherein the conveyer is a belt conveyor.

21. The pallet of claim 1, wherein the frame member includes an opening therein, the opening being operable with a fork lift apparatus for lifting and transporting the pallet and container thereon.

22. The pallet of claim 1, further comprising a lifting member for vertically raising and lowering the frame member and container thereon.

23. The method of claim 16, wherein the frame member includes a first rectangular frame section, a second rectangular frame section of approximately the same size and dimension as the first rectangular frame section and which is connected to and spaced apart from the first rectangular frame section.

24. The method of claim 16, wherein the frame member includes an opening therein, the opening being operable with a fork lift apparatus for lifting an transporting the pallet and container thereon.

* * * * *